United States Patent
You

(10) Patent No.: US 7,063,128 B2
(45) Date of Patent: Jun. 20, 2006

(54) DRUM TYPE HEAT EXCHANGER

(75) Inventor: Byung-sook You, Namyangju-si (KR)

(73) Assignee: Daeryun Ind Co., Ltd, Jeonrabukdo (KR)

( * ) Notice: Subject to any disclaimer, the term of this patent is extended or adjusted under 35 U.S.C. 154(b) by 0 days.

(21) Appl. No.: 10/867,490

(22) Filed: Jun. 14, 2004

(65) Prior Publication Data
US 2004/0250997 A1    Dec. 16, 2004

(30) Foreign Application Priority Data
Jun. 12, 2003 (KR) .................. 10-2003-0037992

(51) Int. Cl.
*F28F 5/02*    (2006.01)
*F24F 7/00*    (2006.01)

(52) U.S. Cl. .................. 165/89; 165/59; 165/8

(58) Field of Classification Search .................. 165/4, 165/6, 7, 8, 9, 48.1, 59, 89, 907, DIG. 9
See application file for complete search history.

(56) References Cited

U.S. PATENT DOCUMENTS

| | | | | |
|---|---|---|---|---|
| 1,654,294 A | * | 12/1927 | Ljungstrom | .................. 165/8 |
| 1,823,481 A | * | 9/1931 | Zander | .................. 165/8 |
| 1,970,127 A | * | 8/1934 | Colby et al. | .................. 165/5 |
| 3,294,156 A | * | 12/1966 | Beaufrere et al. | .................. 165/9 |
| 3,778,874 A | * | 12/1973 | Norback | .................. 29/890.034 |
| 4,596,284 A | * | 6/1986 | Honmann | .................. 165/8 |
| 4,871,607 A | * | 10/1989 | Kuma et al. | .................. 428/186 |
| 5,595,238 A | * | 1/1997 | Mark et al. | .................. 165/9 |
| 6,039,109 A | * | 3/2000 | Chagnot et al. | .................. 165/8 |
| 2002/0139514 A1 | | 10/2002 | Lagace et al. | .................. 165/54 |
| 2003/0075304 A1 | | 4/2003 | Adamcyzk | .................. 165/54 |

* cited by examiner

*Primary Examiner*—Tho Duong
(74) *Attorney, Agent, or Firm*—Mathews, Shepherd, McKay & Bruneau, P.A.

(57) ABSTRACT

A drum type heat exchanger for effectively ventilating and purifying room air of a factory, a building or a house and the like is described. The drum type heat exchanger has heat transfer means with a drum shape and thus an entire size is reduced as much as possible and become compact, such that a handling and an installation is easy, a thermal efficiency to an installation space of the heat transfer means is maximized, and overall maintenance and repair such as a check or exchange of the heat transfer means are easy. Additionally, the drum type heat exchanger uses a drum with a short radius of rotation so that an entire operation cycle time is shortened and a heat transfer area is sufficiently secured in order to keep the thermal efficiency high.

5 Claims, 5 Drawing Sheets

DRUM TYPE HEAT EXCHANGER

BACKGROUND OF THE INVENTION

1. Field of the Invention

The present invention is related to a drum type heat exchanger for effectively ventilating and purifying room air of a factory, a building or a house and the like, more specifically the heat exchanger of which a heat transfer means is formed as a rotatable drum, so that a whole volume of the heat exchanger is significantly reduced so as to be excellent in aspect of a handling and an installation space, and an operation cycle of the heat exchanger is shortened while a sufficient heat transfer area being secured so as to improve an overall performance of the heat exchanger in aspect of efficiency.

2. Background of the Related Art

Generally, most of means for ventilating inner spaces of a factory, a building and a house are apparatuses directly discharging and introducing air such as a fan.

Such ventilating means are not efficient in aspect of thermal efficiency as they discharge cool or warm air in a room as it is in summer or winter.

Many heat exchangers of heat transfer type for making up for these defects have been developed recently.

This heat transfer type heat exchanger takes heat and moisture from an introduced flow of the air and transfer them to a discharged flow of the air so that it carries out preferable ventilation and maintains an air condition. The heat exchanger includes a fan or a blower as means for generating pressure necessary for opposite flows of a discharged air and introduced air to pass through the heat exchanger.

In the heat transfer type heat exchanger, technology for an application of a heat transfer means is more important than anything else in order to raise heat transfer efficiency between the opposite air flows, and much research and development thereto have been achieved.

For example, the heat exchanger having a disk shaped heat transfer means which is typical in conventional heat exchangers is disclosed in Korean Utility Model No. 274948 (which was filed on Feb. 7, 2002 by the applicant of the present application and granted late on). However, as this heat exchanger should make a size of the disk to be large to ensure a sufficient heat transferring area, an entire area and a volume of the heat exchanger become larger such that the heat exchanger is inconvenient to handle and occupies a large space to be installed. Additionally, in case of the disk having a diameter of 450 mm or more, as a radius of rotation is long and it takes much time to rotate the disk, the satisfactory thermal efficiency can not be properly obtained.

Therefore, gradually increased is a request for an improvement of the heat exchanger which is improved without limitation to conventional design such that it includes the heat transfer means having the high efficiency, and has reduced area and volume such that a handling and an installation is easy.

SUMMARY OF THE INVENTION

The present invention is contemplated to solve aforementioned problems, and has an object to provide a drum type heat exchanger in which heat transfer means has a drum shape and thus an entire size is reduced as much as possible and become compact, such that a handling and an installation is easy, a small space is taken for the installation, a thermal efficiency to an installation space of the heat transfer means is maximized, and overall maintenance and repair such as a checkup or an exchange of the heat transfer means are easy in order for the heat transfer means to be recycled and thus a life span of the heat exchanger is extended.

It is another object of the present invention to provide the drum type heat exchanger which uses the drum with a short radius of rotation so that an entire operation cycle time is shortened and a heat transfer area is sufficiently secured in order to keep the thermal efficiency high.

To accomplish above objects, the present invention provides a drum type heat exchanger comprising a main body having an outer air outlet and an inner air inlet formed at a front panel thereof and an outer air inlet and an inner air outlet formed at both side panel respectively, the main body having an outer air chamber and an inner air chamber defined by dividing an inner space thereof with a blocking plate disposed in a length direction so as to enable indoor air and outdoor air to flow out of and flow into the room; a heat transfer drum disposed over both chambers along a length direction thereof in the main body and rotatable with both ends thereof being supported by a plurality of rollers, the heat transfer drum performing heat exchange between the indoor and outdoor air by traveling both chamber during rotation; and a driving motor located at one side in the main body and rotating the heat transfer drum connected therewith by a belt.

A brush is installed between the heat transfer drum and the blocking plate inserted in the heat transfer drum and between walls of the main body and the heat transfer drum so as to prevent movement of heat between both chambers.

The heat transfer drum comprises a drum body having roller guide surfaces formed continuously along a circumference at both ends thereof and a pulley formed at a middle portion thereof, the drum body formed to be a porous meshed cylinder; and a heat transfer medium attached to an entire circumferential surface of the drum body with a fixed thickness and performing the heat exchange with the air.

The heat transfer medium is formed to be single body surrounding the cylindrical heat transfer drum at once or a dividable body comprising several pieces to surround the heat transfer drum.

The heat transfer medium is made of one of polyester particles, glass fiber, nonferrous metal, and foamed plastic.

The rollers guiding a rotation of the heat transfer drum are mounted to be able to idle at the front panel and a rear panel of the main body, and wherein four rollers are disposed in a lattice form so as to support the four points of the circumference of the drum.

The present invention mentioned above improves an entire performance of the heat exchanger and a convenience for use and maintenance of the heat exchanger.

BRIEF DESCRIPTION OF THE DRAWINGS

The features and advantages of the present invention will be more described specifically in the following description of preferred embodiments of the invention with reference to the accompanying drawings wherein.

DETAILED DESCRIPTION OF THE PREFERRED EMBODIMENT

Figure 1:
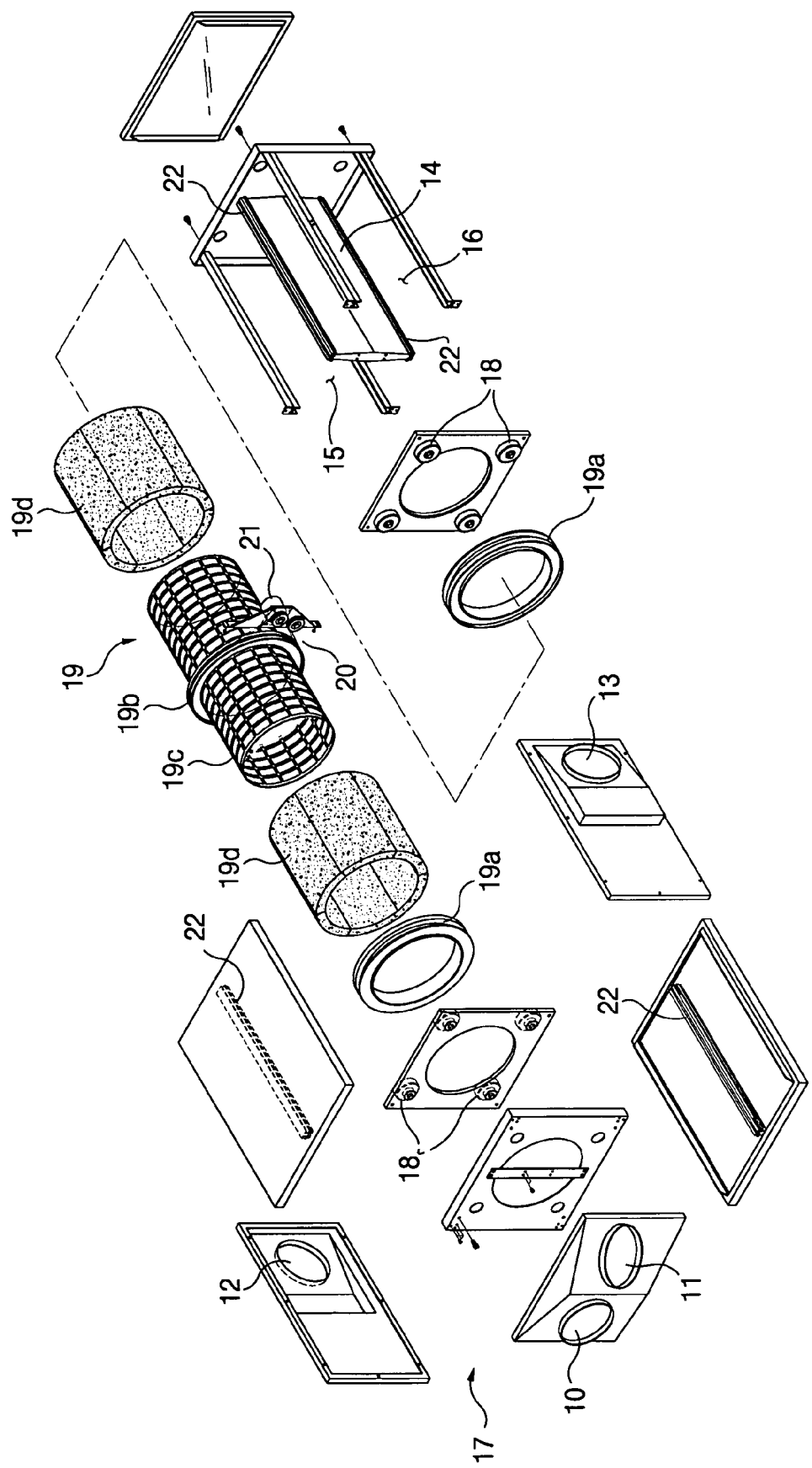
FIG. 1 is an exploded perspective view showing a drum type heat exchanger according to the present invention.

Reference will now be made in detail to an embodiment of the present invention, examples of which are illustrated in the accompanying drawings. In explaining the present invention, the same names and reference numerals will be given to the same components, and explanations in the same will be omitted.

A drum type heat exchanger according to the present invention is characterized by including heat transfer means of a drum shape.

This drum shaped heat transfer means transmits sensible heat energy and latent heat energy to two air flows passing therethrough, with rotating by a predetermined driving means.

Also, the drum shaped heat transfer means is disposed in a main body of the heat exchanger, and is combined with a blocking plate which can prevent a mutual mixture of two opposite air flows.

The drum shaped heat transfer means includes a heat transfer medium which has sufficient porosity enabling a passage of the air and sufficient density for introducing turbulence into the airflow and providing a surface for heat transfer.

For example, the heat transfer medium can be made of polyester particles, glass fiber, nonferrous metal, and foamed plastic. Preferably, proper amount of a deodorant can be added to raw materials mentioned above to remove an odor, and zeolite can be added to remove bacteria and mold caused to inhabit the heat transfer medium dur to moisture in the air.

When the particle material such as the polyester, the glass fiber, and the nonferrous metal and the like is used as the heat transfer medium, a container is provided to accommodate such material and to be coupled on a surface of the drum shaped heat transfer means. When the material such as the foamed plastic which is easily formed is applied, the heat transfer medium is formed as an independent body.

Figure 2:
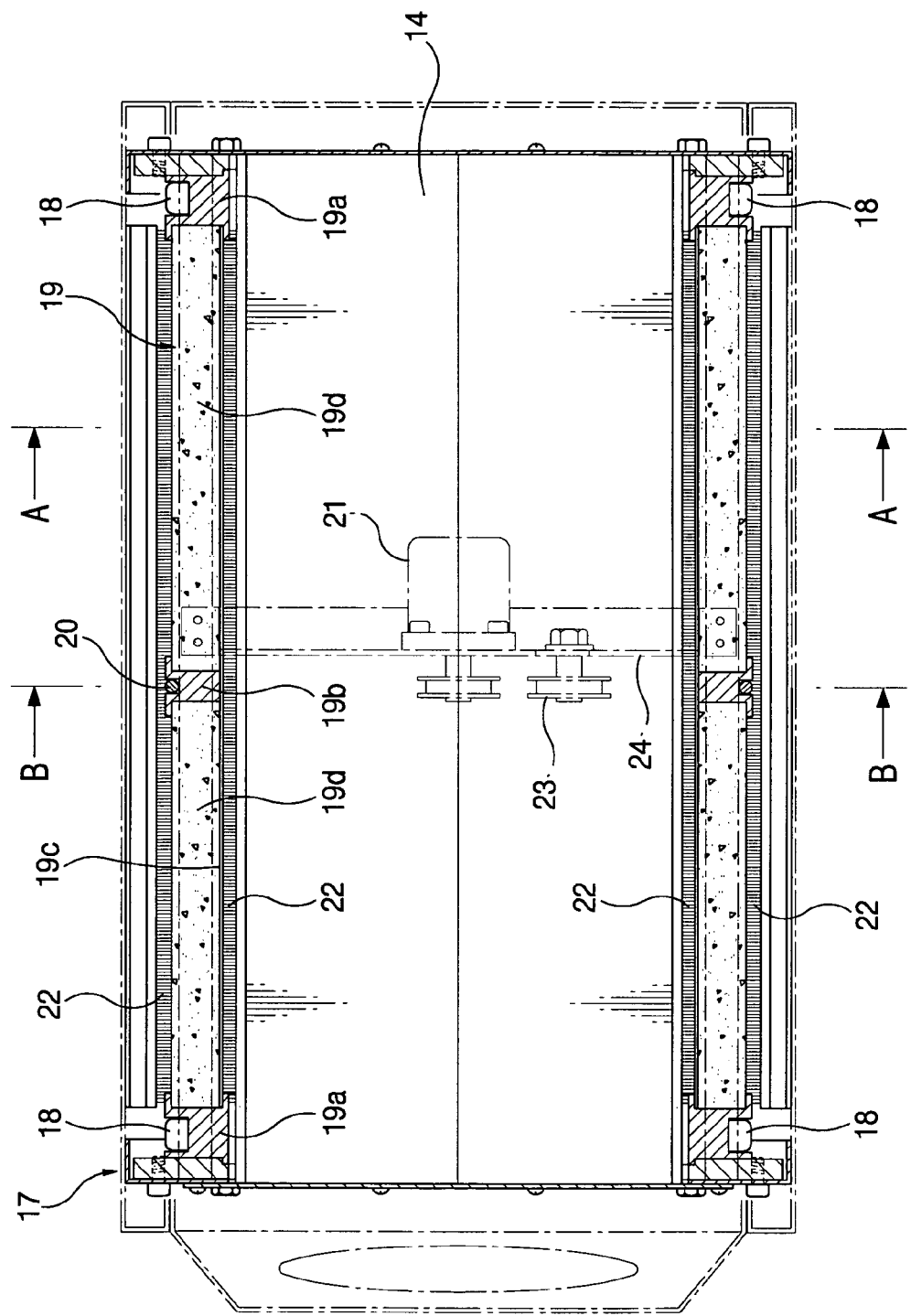
FIG. 2 is a front sectional view showing the drum type heat exchanger according to the present invention.
Figure 3:
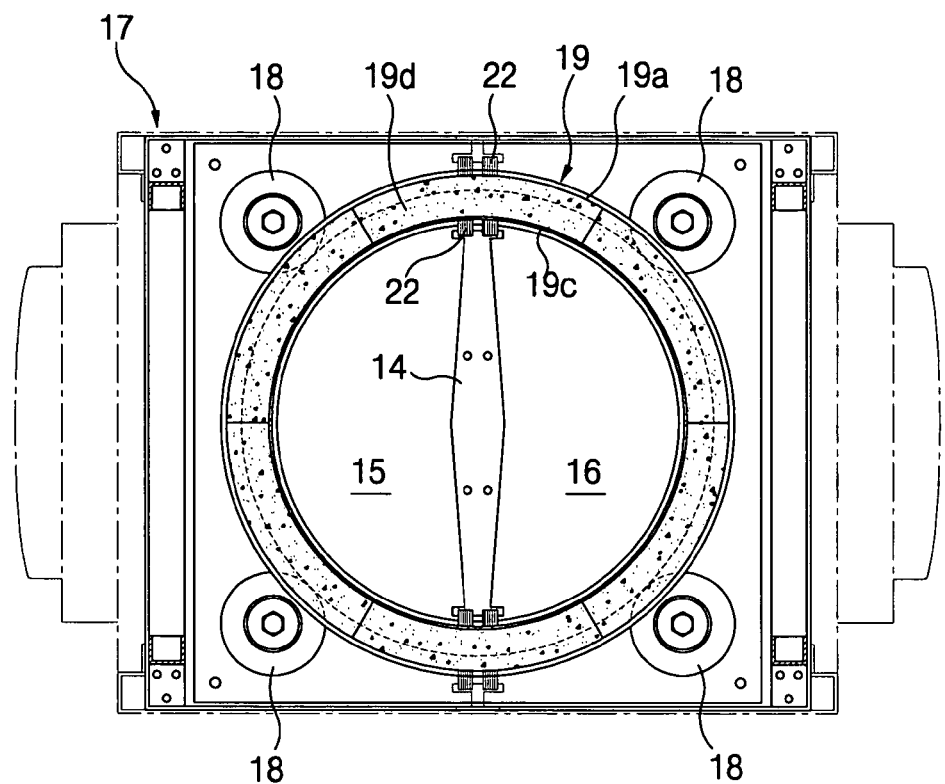
FIG. 3 is a sectional view taken along A—A line of FIG. 2.

FIG. 1 is an exploded perspective view showing a drum type heat exchanger according to the present invention, FIG. 2 is a front sectional view showing the drum type heat exchanger according to the present invention, and FIG. 3 is a sectional view taken along A—A line of FIG. 2.

As shown, a heat transfer medium 19d for a heat exchange can be configured to surround an entire circumference of a drum body 19c which is a porous meshed cylinder. The heat transfer medium 19d is formed to be single body surrounding the whole drum body 19c or a dividable body comprising several pieces assigned to each of sections into which the entire circumference of the drum body 19c is divided.

The dividable body is advantageous for checking or exchanging the heat transfer medium 19d.

Figure 4:
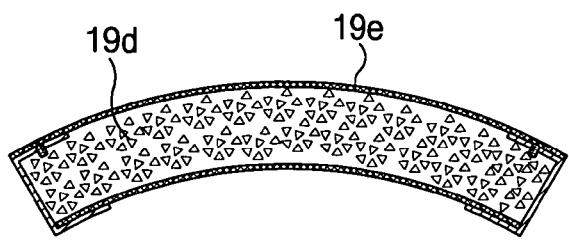
FIG. 4 is a sectional view showing one embodiment of a heat transfer medium in the present invention.

For example, if the heat transfer medium 19d is formed as the independent body using the foamed plastic, the check and the exchange are easier. On the contrary, as shown in FIG. 4, if the heat transfer medium 19d made of the particle material, the heat transfer medium 19d can be installed in the container by detaching and reinstalling a mesh member 19e comprising an outer wall of the container and can be easily checked and exchanged by detaching the mesh member 19e. Also, the container containing the heat transfer medium 19d made of the particle material can be exchanged separately.

A heat transfer drum 19 having such heat transfer medium 19d is disposed in a rectangular tube shaped main body 17 along a length direction. Two isolated spaces are defined by a blocking plate 14 which extends in a length direction along a center axis of the main body 17, and the drum 19 performs the heat exchange operation with being laid over both of the isolated spaces.

For such heat exchange, an outer air outlet 10 and an inner air inlet 11 which are oriented in different directions is formed at a front panel of the main body 17, and an outer air inlet 12 and an inner air outlet 13 are formed at both side panels respectively. The blocking plate 14 is installed to extend along the length direction of the main body 17 with reference to a center portion between the inlet and the outlet in the front panel, so that it defines two isolated spaces, i.e. an outer air chamber 15 and an inner air chamber 16.

Accordingly, flows in opposite directions of an outer air and an inner air are formed in the main body 17, and the heat exchange is performed in the chambers by the heat transfer drum extending over both of the chambers.

For example, the outer air is introduced through the outer air inlet 12 and the heat transfer medium 19d located in the outer air chamber 15, and then is provided in a room though the outer air outlet 10. The inner air is introduced into the inner air chamber 16 through the inner air inlet 11, and then is discharged outside sequentially passing through the heat transfer medium 19d located in the inner air chamber 15 and the inner air outlet 13. The inner air and the outer air exchange sensible heat and latent heat thereof using the heat transfer medium 19d extending over both chambers during staying in each chamber. That is, without discharging inner heat to the outside, fresh air is introduced from the outside and only odor is gone outside.

A blowing means is selectively installed direct to each inlet and outlet together with a grill, or a duct or a hose extending from an external blowing means is connected to so as to induce the air flow.

A brush 22 is provide as means for cutting off heat movement between the chambers while the heat exchange is performed in both chamber by the heat transfer drum 19.

The brush 22 is installed between the blocking plate 14 defining both chamber and an inner circumferential surface of the drum 19 and between upper and lower plates of the main body 17 and an outer circumferential surface of the drum 19, respectively. The brush 22 intercepts heat movement between the outer air chamber 15 and the inner air chamber 16, so that it serves to reduce heat loss as much as possible and to keep high thermal efficiency of the heat exchanger.

The heat transfer drum 19 can rotate with a predetermined speed between chambers in order to perform the heat exchange to the air.

Figure 5:
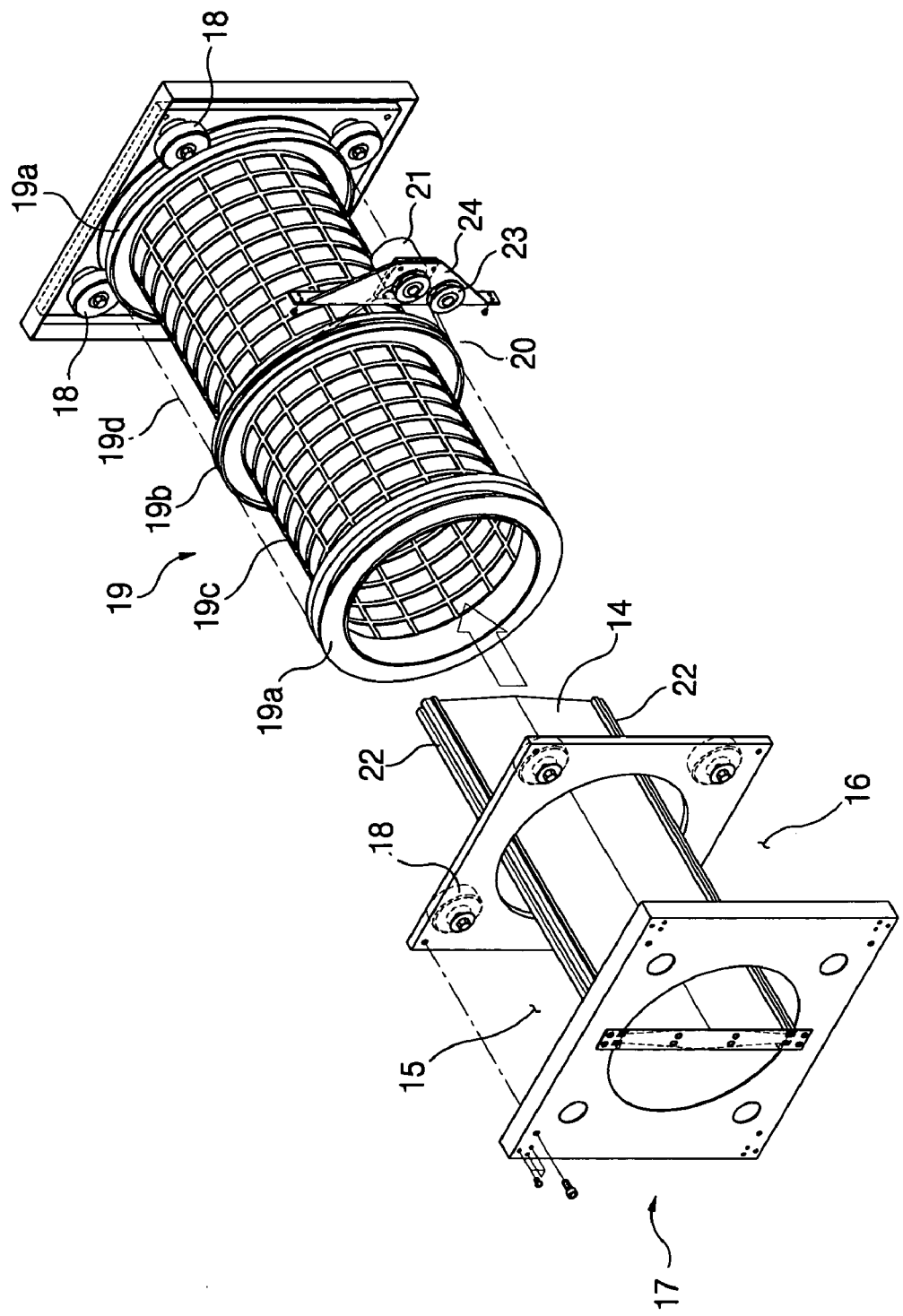
FIG. 5 is a perspective view showing a coupling of a heat transfer drum in the present invention.
Figure 6:
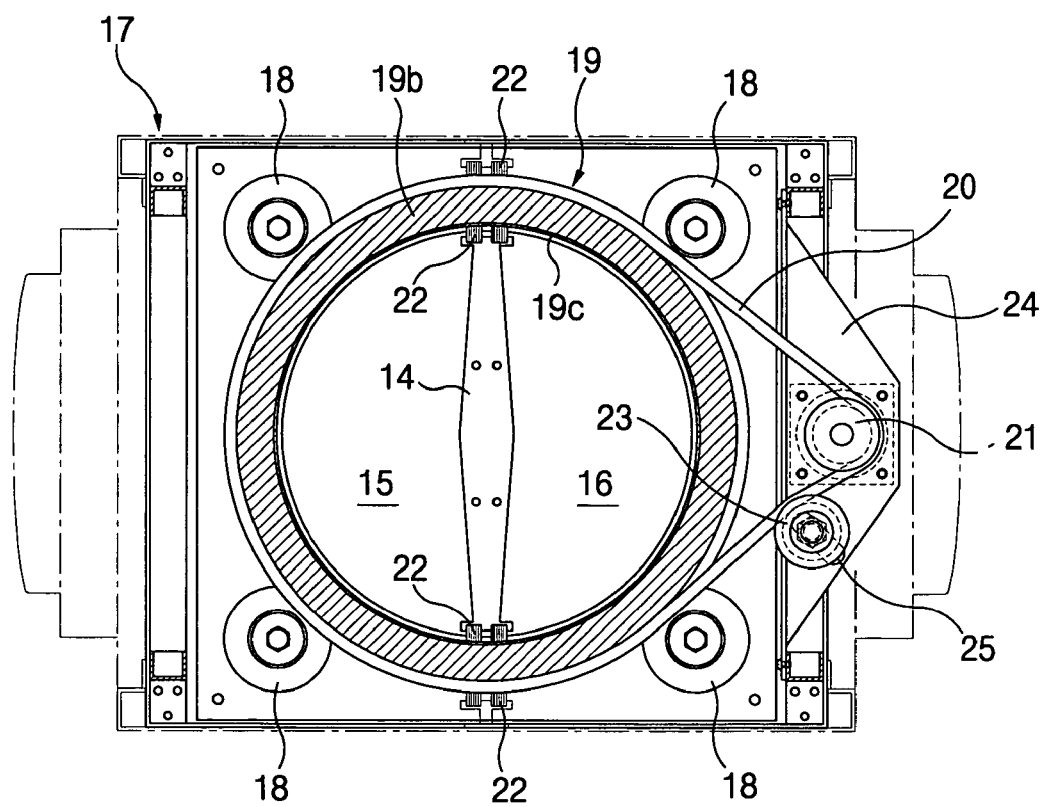
FIG. 6 is a sectional view taken along B—B line of FIG. 2.

As shown FIG. 5, the drum body 19c of the heat transfer drum 19 has roller guide surfaces 19a continuously formed along the circumferences of both ends thereof and a pulley 19b formed in a middle portion of the body 19, and is concentrically positioned in the main body 17. The heat transfer medium 19d is coupled between both roller guide surfaces 19a and the pulley 19b. Each roller guide surface 19a is stably supported by four rollers 18 which can idle and are arranged in a lattice format at both front panel and rear panel respectively, and thus the drum body 19c is rotatable entirely supported at eight points. As shown in FIG. 6, the pulley 19b is connected by a belt 20 with a pulley of a driving motor 21 which is located at one side of the drum body 19c so that the heat transfer drum 19 can be rotated by the driving motor 21.

The driving motor 21 is installed using a plate bracket 24 fixed to the main body 17 of the heat exchanger, and an idler 23 adjustable along a slot 25 is installed at one side of the bracket 24 so as to adjust tension of the belt 20, if necessary.

It is preferable that rotation speed of the driving motor, i.e. rotation speed of the heat transfer drum is 20–40 rpm.

If the rotation speed of the heat transfer drum is too low, the efficiency of the heat exchanger is reduced, and if the rotation speed is excessively high, an intersection or a mixture of the opposite airflows can occur and thus amount of ventilation is reduced. However, the heat transfer drum of the present invention has a heat transfer surface sufficient for the heat exchange and a rotation radius thereof is not great. Therefore, though the heat transfer drum is rotated with high speed mentioned above, it maintains the excellent thermal efficiency.

Meanwhile, in the present invention the drum type exchanger includes additional air purification means including filtering material for purifying discharged or introduced air.

Though the heat transfer medium can carry out filtering with regard to some kind of particles, and especially may have good filtering effect according to the material of which the medium consists, it is preferable for the heat exchanger to be combined with the air purification means mentioned above.

The air purification means, for example the filter material is especially provided to the outer air inlet 12 so as to supply clean air to the room or purify air to be forwarded to the heat transfer medium, after filtering impurities in the outer air.

Such adoption of the air purification means effectively increases applicability of the drum type heat exchanger.

The drum type heat exchanger according to the present invention is mainly installed to a window, and can be disposed in the room by extending the duct or hose outside. In addition, the heat exchanger may be laid into the ceiling and can be installed in various ways.

The heat exchange operation of the drum type heat exchanger will be explained in detail.

Two opposite air flows passes through the heat transfer drum 19 in the main body having the inner and outer air chambers 15, 16 divided by the plate 14 and the heat transfer drum 19 traveling through the chambers with being rotated by the motor That is, to achieve the heat exchange with the heat transfer medium, the outer air is introduced in a radial direction of the drum 19 and then guided along an axial direction thereof, and the inner air is introduced in the axial direction and then guided along the radial direction.

Two opposite air flows are produced by the blowing means connected to the inner air inlet 11 and the outer air inlet 12, and then the sensible and latent heat is exchanged between the inner air and the outer air, passing through the rotating heat transfer drum 19. Therefore, the discharged air flows outside with the sensible and latent heat are taken and the introduced air flows into the room passing through the heat transfer drum 19 and taking the sensible and latent heat gathered in the drum during discharging the inner air.

As such, due to the heat transfer efficiency and the material characteristics of the heat transfer medium and the large surface for the heat exchange, the present invention provides the drum type heat exchanger which is simple in an entire size and an operating method such as a volume of the heat exchanger and the rotation speed, and is easy in an installation thereof. Therefore, as room air is ventilated performing the heat exchange by using the heat transfer drum which can gather the sensible and latent heat and can vary the opposite positions of the air flows by the rotation, an efficient air conditioning effect can be obtained restraining heat loss in the room.

The advantages of the heat exchanger according to the present invention are summarized as follows.

The present invention provides the heat exchanger including the heat transfer means of the drum shape. Accordingly, performance of the heat exchanger is greatly increased. More specifically, a cross section of the heat transfer medium can be increased to ensure a sufficient heat transfer area, and an entire width and volume can be reduced so that a checkup and an exchange are easy and a large space is not occupied for the installation. Especially, the sufficient heat transfer area is obtained and a cycle time to the number of rotation per time is shortened, such that the excellent heat exchange efficiency is obtained.

In addition, the present invention can be used with the additional air purification means using the duct.

Although a number of embodiment have described in the above specification, it should be apparent that the present invention could be embodied in many other specific mode included within the sprit and scope of the present invention. Thus, the present embodiments should be considered as illustrative, and the present invention could be modified within the scope of claims and the equivalent thereof.

What is claimed is:

1. A drum type heat exchanger comprising:
a main body having an outer air outlet and an inner air inlet formed at a front panel thereof and an outer air inlet and an inner air outlet formed at both side panel respectively, the main body having an outer air chamber and an inner air chamber defined by dividing an inner space thereof with a blocking plate disposed in a length direction so as to enable indoor air and outdoor air to flow out of and flow into the room;
a heat transfer drum disposed over both chambers along a length direction thereof in the main body and rotatable with both ends thereof being supported by a plurality of rollers, the heat transfer drum performing heat exchange between the indoor and outdoor air by traveling both chambers during rotation;
a driving motor located at one side in the main body and rotating the heat transfer drum connected therewith by a belt wherein the heat transfer drum comprising:
a drum body having roller guide surfaces formed continuously along circumferences of both ends thereof and a pulley formed at a middle portion thereof, the drum body formed to be a porous meshed cylinder;
a heat transfer medium attached to an entire circumferential surface of the drum body with a fixed thickness and performing the heat exchange with the air.

2. The heat exchanger according to claim 1, wherein a brush is installed between the heat transfer drum and the blocking plate inserted in the heat transfer drum and between walls of the main body and the heat transfer drum so as to prevent movement of heat between both chambers.

3. The heat exchanger according to claim 1, wherein the heat transfer medium is formed to be a single body surrounding the cylindrical heat transfer drum at once or a dividable body comprising several pieces to surround the heat transfer drum.

4. The heat exchanger according to claim 1, wherein the heat transfer medium is made of one of polyester particles, glass fiber, nonferrous metal, and foamed plastic.

5. The heat exchanger according to claim 3, wherein the heat transfer medium is made of one of polyester particles, glass fiber, nonferrous metal, and foamed plastic.

* * * * *